Nov. 19, 1968    L. C. VERCELLOTTI    3,412,302
REVERSIBLE DIRECT COUPLED DRIVE CIRCUIT FOR STEPPING MOTORS
Filed April 28, 1966    2 Sheets-Sheet 1

WITNESSES:
Leon M. Garman
Wm. B. Sellers.

INVENTOR
Leonard C. Vercellotti
BY C. F. Possessky
ATTORNEY

United States Patent Office 3,412,302
Patented Nov. 19, 1968

3,412,302
REVERSIBLE DIRECT COUPLED DRIVE CIRCUIT FOR STEPPING MOTORS
Leonard C. Vercellotti, Verona, Pa., assignor to Westinghouse Electric Corporation, Pittsburgh, Pa., a corporation of Pennsylvania
Filed Apr. 28, 1966, Ser. No. 545,893
8 Claims. (Cl. 318—138)

The present invention relates to motor drive circuits and more particularly to drive circuits for stepping motors used in digital to analog conversion systems.

One form of motor often used in digital to analog conversion systems is a three phase stepping motor having a permanent magnet rotor. Stepped rotor movement is achieved by the use of a drive circuit which sequentially applies successive pulses to the respective stator phase windings of the motor. The rotor can thus be used to control an analog element in response to digital pulses applied at the input of the drive circuit. As one example, the controlled analog element can be a potentiometer which provides an analog set point. In a digital process computer system, a predetermined number of stepping motors can be used to control respective set point potentiometers in response to computer generated digital pulses routed appropriately to the various motor drive circuits.

In one typical motor drive circuit, thyristors or silicon controlled rectifiers are employed as power switches respectively associated with the stator phases to control stepping motor energization in response to digital input pulses with switch commutation provided by coupling capacitors connected between the thyristors. Reversible operation can be achieved by the use of a ring counter associated with the thyristor gating controls. For economy the ring counter might be implemented using capacitive coupled circuitry. Further, the capacitor coupled circuitry can cause the state of motor energization to be ambiguous, that is two or more stator windings can be simultaneously energized when only one winding should be energized. In many applications and in computer systems in particular, direct coupled drive circuitry is preferred in order to provide direct current actuation of all the power switches in response to digital input pulses and thereby avoid the characteristic shortcomings of drive circuits having capacitive or A.C. internal coupling.

In accordance with the broad principles of the present invention, an improved drive circuit for multiphase permanent magnet rotor stepping motors comprises respective electronic power switches arranged to energize the respective stator phase windings of the motor directly in response to successive digital input pulses without the limitations imposed by capacitive or A.C. coupled circuitry within the drive circuit. A logic circuit including a power switch memory circuit controls the direct routing of successive digital input pulses to the power switches thereby determining the order in which the power switches are successively and directly operated and accordingly the direction of motor movement. In three phase applications, the power switches are preferably connected to form a tristable NAND circuit and the memory circuit preferably includes a tristable NOR circuit to optimize or nearly optimize circuit organization efficiency and economy. The NAND and NOR logic elements are operated with ground states representing logical "zeros" and voltage levels representing logical "ones."

It is therefore an object of the invention to provide a novel and improved reversible direct coupled drive circuit for permanent magnet rotor stepping motors which is characterized with reliability, economy and efficiency.

Another object of the invention is to provide a novel and improved reversible direct coupled drive circuit which operates permanent magnet rotor stepping motors without ambiguous output states.

A further object of the invention is to provide a novel and improved reversible direct coupled drive circuit for permanent magnet rotor stepping motors which is characterized with high noise rejection capability.

These and other objects of the invention will become more apparent upon consideration of the following detailed description along with the attached drawings, in which.

Figure 1:
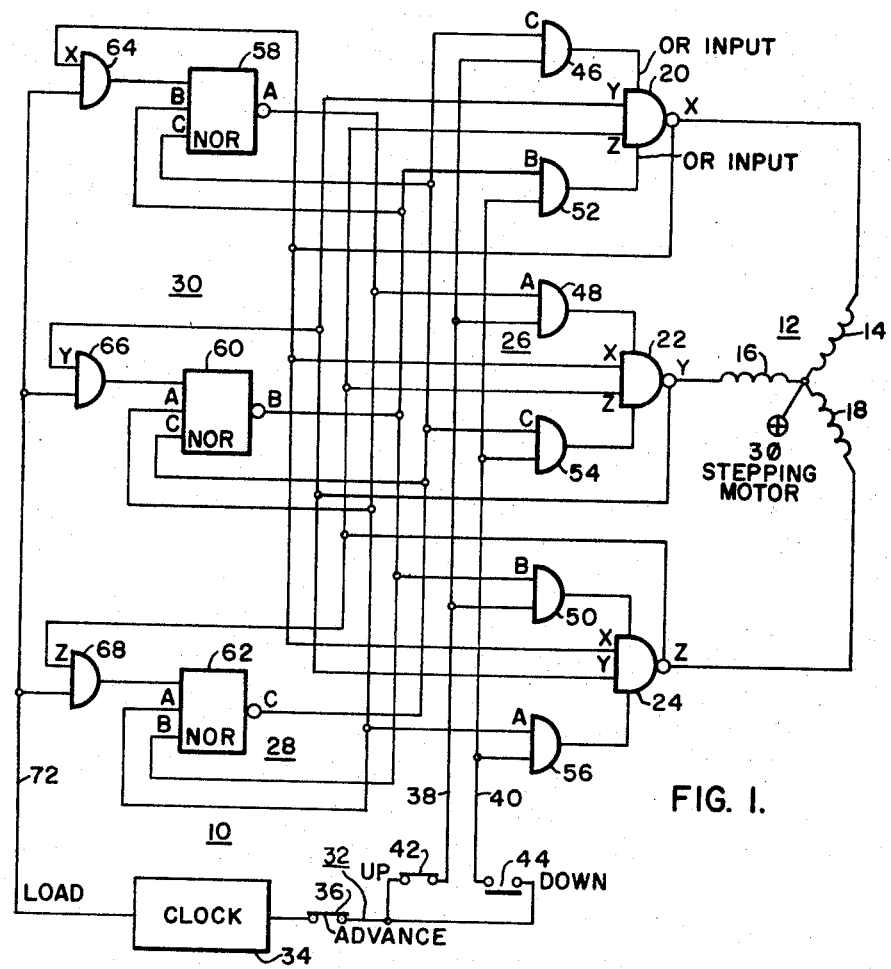
FIGURE 1 is a schematic diagram of a reversible direct coupled motor drive circuit arranged in accordance with the principles of the invention.

More specifically, there is shown in FIG. 1 a drive circuit 10 arranged in accordance with the principles of the invention to operate a multiphase motor 12 having a permanent magnet rotor (not shown). In this instance, the motor 12 is a commercially available three-phase motor having respective stator windings 14, 16 and 18 connected in a wye network. Current supplied to the stator windings flows through the common junction from a suitable power supply.

The motor 12 is suitably rated to permit the desired range of stepping speeds. For example, the motor 12 can have a rating of 400 c.p.s. so as to permit relatively rapid change in the analog set point of a potentiometer (not shown) to which the rotor of the motor 12 is connected. Full scale movement of the potentiometer can be provided by as many as 1000 motor movement steps or more.

With a large number of motors 12 and associated drive circuits 10 arranged together in a single digital computer process control system, the total power current employed for energizing the stepping motors along with other system current flows can produce a high noise electrical environment within which the motor drive circuits must be operated. In large system applications of the drive circuit 10 and in other noise environment applications, it is therefore essential to operating reliability that the circut 10 have a relatively high noise rejecting capability. Accordingly, the circuit 10 is direct coupled without special coupling capacitance or the like so that filter capacitance can be employed to achieve the required noise rejection level substantially without affecting other functions of the motor drive circuit 10. With direct coupling as opposed to capacitor commutation or A.C. coupling, the circuit 10 is also adaptable to provide a wide range of motor stepping speeds since the limitations on drive circuit operating speed otherwise imposed by commutation capacitance are eliminated.

Current flow through the respective stator windings 14, 16 and 18 is controlled by electronic power switch circuits or switches 20, 22 and 24 which are preferably interconnected to form an overall tristable NAND power switch circuit 26 such that one switch is conducting and two switches are blocking at all times. Accordingly, an output X, Y or Z from each power switch is connected to an input of each of the other two power switches. Since only one of the power switches 20 or 22 or 24 can be conductive at any one time, ambiguity in motor performance caused by current flow in two or more stator windings at any one time is avoided.

In turn, the power switch circuit 26 is operated by a control logic circuit 28 which determines the state of the power switches 20, 22 and 24 as a function of time. To produce the required control, the control logic circuit 28 includes a power switch memory circuit 30 and other logic circuitry.

Figure 3:
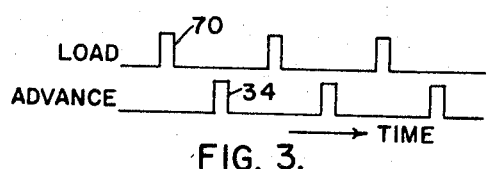
FIG. 3 shows the time function of clock pulses employed in operating the circuits of FIGS. 1 and 2.

Stepping motor movement is produced as successive digital pulses are generated on an ADVANCE bus 32 by a two-phase clock 34 which is suitably controlled by a computer (not shown) or other means. ADVANCE pulses 34 (FIG. 3) are routed to the motor drive circuit 10 through a relay contact 36 or the like if contact closure has been directed by the computer to achieve a change in the analog set point controlled by the illustrated motor 12.

To provide reversible operation, the ADVANCE bus 32 is divided into UP and DOWN buses 38 and 40. Computer operated relay contacts 42 and 44 or the like determine which of the two buses 38 and 40 carries the ADVANCE pulses and consequently the direction in which the motor 12 is stepped.

After the contact 36 has been closed by the computer, the number of ADVANCE pulses 34 generated on the UP bus 38 or the DOWN bus 40 is equal to the number required to step the motor load to a point computed by the computer. When the required number of advance pulses 34 has been generated, further motor stepping movement is suitably prevented, for example by opening of the contact 36.

The UP bus 38 is coupled to respective OR inputs of the respective NAND power switches 20, 22 and 24 through respective suitable AND circuits 46, 48 and 50. Similarly, the DOWN bus 40 is connected to respective OR inputs of the respective NAND power switches 20, 22 and 24 through respective AND circuits 52, 54 and 56.

It is noted for clarification that the power switches 20, 22 and 24 are referred to as NAND switches to emphasize the interconnection of power switch outputs and inputs in the circuit 26. However, the power switch inputs from the AND circuits 46 through 56 can override signal conditions established by other power switch inputs to cause the related switch 20, 22 or 24 to conduct. The AND circuit inputs thus bear an OR relationship to the other power switch inputs. Additional explanation of this special terminology is subsequently presented herein.

In this instance, the sequence X, Y, Z corresponds to UP movement and the sequence X, Z, Y corresponds to DOWN movement. Thus, a series of ADVANCE pulses 34 on the UP bus 38 causes the power switches 20, 22 and 24 to become conductive in the X, Y, Z sequence, while a series of ADVANCE pulses 34 on the DOWN bus 40 causes the power switches to become conductive in the X, Z, Y sequence. Outputs A, B, and C from the memory circuit 30 are coupled to inputs of the AND circuits 46–56 to cooperate with the UP and DOWN pulses in logically determining the power switching operations and the order in which said operations occur.

The memory circuit 30 preferably includes a memory element associated with each of the motor phases, and each memory element is preferably in the form of a NOR circuit. Accordingly, three NOR circuits 58, 60 and 62 are employed. Further, the NOR circuits 58, 60 and 62 are interconnected to make the memory circuit 30 a tristable NOR circuit with one element blocked and two elements conducting at all times. Tristability is realized by conducting the output from each of the NOR circuits to an input of each of the other two NOR circuits.

Employment of the tristable circuit 26 and the tristable circuit 30 optimally minimizes the number of active elements required to produce the logic needed for drive circuit operation. Further, the employment of NOR and NAND circuits as described optimally minimizes the loading on the memory circuit 30 and, with the use of diode transistor logic hardware, optimally minimizes the required number of gating diodes.

The basic purpose of the memory circuit 30 is to register temporarily the state of the power switching circuit 26 so that the proper power switch is operated when the next ADVANCE pulse 34 occurs. Accordingly, the outputs from the power switches 20, 22 and 24 are respectively connected to respective suitable AND circuits 64, 66 and 68 which in turn are connected to respective inputs of the NOR circuits 58, 60 and 62. LOAD pulses 70 (FIG. 3) are generated on a LOAD bus 72 by the two-phase clock 34 to operate as gating signals which control the operation of the AND circuits 64, 66 and 68 and in turn the NOR circuits 58, 60 and 62.

In illustration of the operation of the motor drive circuit 10, assume that the NAND power switch 20 is in a conductive state such that X is equal to logic 0 and winding impedance limited current is flowing through the stator winding 14. Typically, the amplitude of such current would be 350 milliamperes. Thus, as previously indicated, the total return current flow to a common motor power supply can be a sizable noise source in a process control system having a large number of stepping motors.

The contact 36 is then closed for application of the predetermined or computed number of digital input pulses, in this instance two pulses on the UP bus 38. Before the first ADVANCE pulse 34, a LOAD pulse 70 is applied to the bus 72 to cause a logic 0 output from the AND circuit 64 and logic 1 outputs from the AND circuits 66 and 68. The B and C NOR outputs thus become logic 0 and the NOR output A is generated at logic 1 value.

When the first ADVANCE pulse 34 is generated on the UP bus 38, the AND circuit 48 operates through its OR coupling to make the power switch 22 conductive (i.e. Y becomes equal to logic 0). The winding 16 thus carries current and the rotor of the motor 12 is advanced through one step. Current in the winding 14 is terminated as current starts to flow in the winding 16 since the power switch 20 has no OR input signals from the AND circuits 46 and 52 and must become non-conductive as the power switch 22 becomes conductive in order to maintain the tristable NAND relationship of the circuit 26.

When the next LOAD pulse 70 is generated, the NOR output B acquire a logic 1 value and the NOR outputs A and C become logic 0. With the generation of the second ADVANCE pulse 34, the AND circuit 50 drives the power switch 24 to produce the output Z at a logic 0 value. Current thus flows through the stator winding 18 as the switch 22 becomes nonconductive to block current in the stator winding 16.

The rotor accordingly advances another step, and the contact 36 is then opened to cause the rotor to hold in its last position. When ADVANCE pulses are applied to the DOWN bus 40, the motor 12 is operated in a manner similar to that just described but in the reverse direction.

In summary, digital input pulses are coupled directly to the switches 20, 22 and 24 to control the operation of the motor 12 without commutation or other switching control capacitance. Filtering capacitors can thus be employed in the drive circuit 10 for noise rejection. With logically controlled multistable power switch and memory circuits, ambiguous states of drive circuit operation are reliably avoided with economy and efficiency. The following logic equations summarize the logic operation of the NOR tristable memory circuit 30:

$$A = \overline{B + C + (X \cdot LOAD)}$$
$$B = \overline{A + B + (Y \cdot LOAD)}$$
$$C = \overline{A + C + (Z \cdot LOAD)}$$

The following logic equations summarize the logic operation of the NAND power switch circuits 20, 22 and 24:

$$X = \overline{(Y \cdot Z) + (C \cdot UP) + (B \cdot DOWN)}$$
$$Y = \overline{(X \cdot Z) + (A \cdot UP) + (C \cdot DOWN)}$$
$$Z = \overline{(X \cdot Y) + (B \cdot UP) + (A \cdot DOWN)}$$

Figure 2:
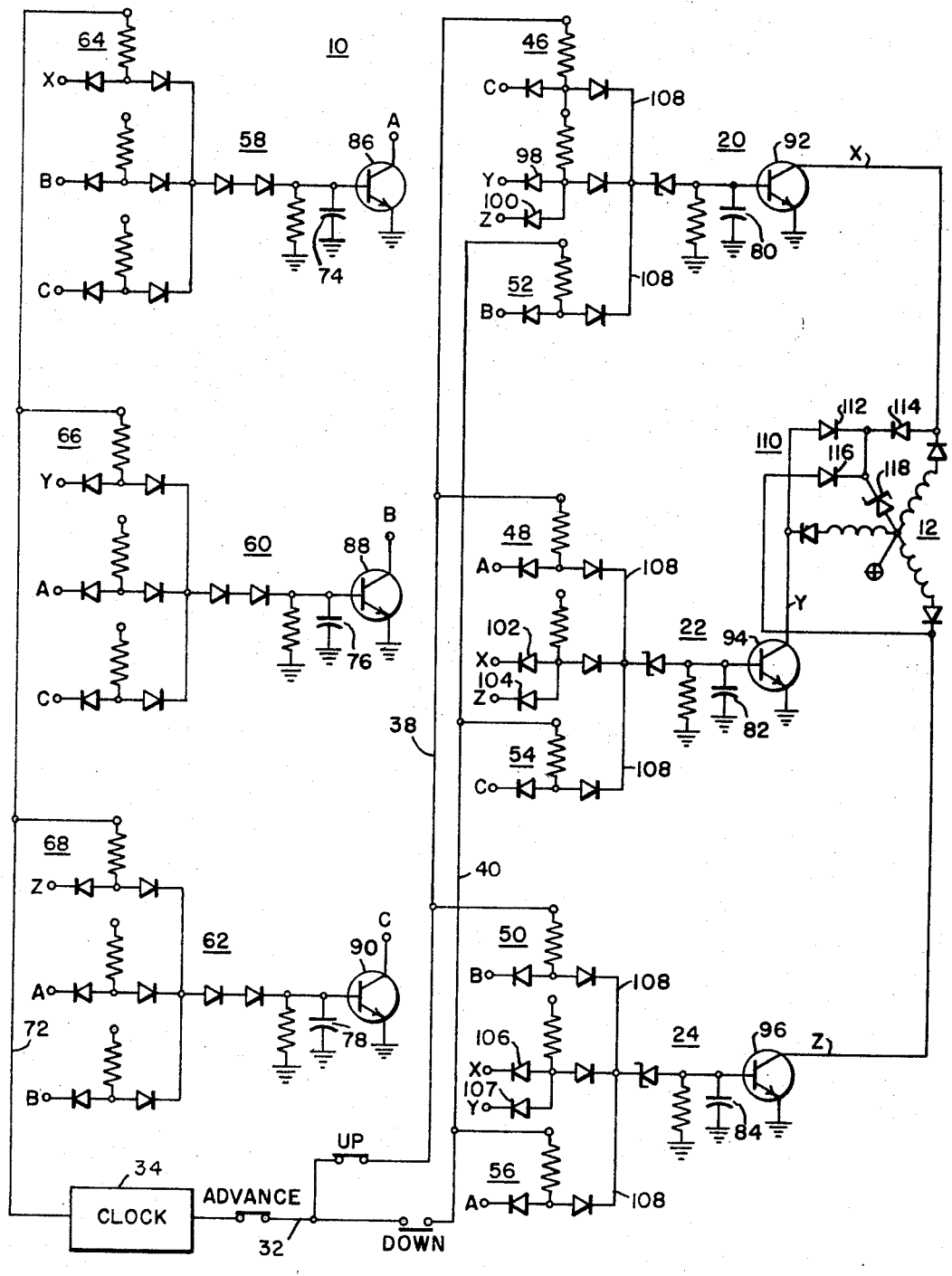
FIG. 2 shows a more detailed schematic diagram of the circuit shown in FIG. 1.

The motor drive circuit 10 can be provided in monolithic form, or it can be formed from molecular blocks or separate components. Although other logic types are usable, it is preferred that diode transistor logic be employed. Thus, as shown in FIG. 2, the preferred embodiment of the circuit 10 includes diodes, resistors and transistors connected in logic circuits described in connection with FIG. 1.

Capacitors 74, 76, 78, 80, 82 and 84 provide filtering particularly for high frequency noise rejection. Transistors 86, 88 and 90 operate as the memory circuit elements by connection in respective NOR circuits. The operation of transistor NOR circuitry is well understood in the art and is therefore believed to be apparent from the diagrammed circuitry.

The NAND power switch circuits 20, 22 and 24 respectively include transistors 92, 94 and 96 having outputs which are interconnected through diodes 98, 100 and 102, 104 and 106, 108 to form the NAND tristable circuit 26. As indicated by the reference character 108, all of the AND circuits 46 through 56 are connected as OR inputs to the NAND switches 20, 22 and 24. It was previously indicated that the characterization of the power switches 20, 22 and 24 as NAND switches is for the purpose of emphasizing the internal logical relationship among the switches 20, 22 and 24. As clearly observed in FIG. 2, the power switches can alternately be characterized as NOR switches having inputs from the associated AND circuits 46–56 and from AND circuits respectively formed by the diode pairs 98, 100 and 102, 104 and 106, 108.

To protect the collectors of the transistor power switches 92, 94 and 96, it is preferred that a stator interconnected suppression network 110 be employed. The suppression network 110 includes diodes 112, 114 and 116 in combination with a Zener diode 118 to prevent the application of voltage spikes at the transistor collector terminals.

The foregoing description has been presented only to illustrate the principles of the invention. Accordingly, it is desired that the invention not be limited by the embodiment described, but, rather that it be accorded an interpretation consistent with the scope and spirit of its broad principles.

What is claimed is:

1. A reversible direct coupled drive circuit for a multiphase stepping motor having a permanent magnet rotor, said drive circuit comprising a power switch associated with each stator phase winding to control current flow therein, a memory circuit responsive to digital input LOAD pulses for storing information as to the state of each of said power switches during each step of motor operation, means responsive to said memory circuit for sequentially operating said power switches in a selectable order in response to digital input ADVANCE pulses which are timed to occur alternately with and after the LOAD pulses, and means substantially free of capacitance interconnecting said power switches so that one of said power switches is conductive and the other power switches are non-conductive in each motor operating step.

2. A reversible direct coupled drive circuit for a multiphase stepping motor having a permanent magnet rotor as set forth in claim 1, wherein the last-mentioned means comprises logic circuitry coupling the outputs of said power switches to predetermined inputs of said power switches so as to form a power switch circuit having a number of stable states equal to the number of said power switches.

3. A reversible direct coupled drive circuit for a multiphase stepping motor as set forth in claim 2, wherein said memory circuit comprises respective NOR circuits coupled to the outputs of the respective power switches, and means coupling the outputs of said NOR circuits to predetermined inputs of said NOR circuits so as to form a NOR memory circuit having a number of stable states equal to the number of said power switches.

4. A reversible direct coupled drive circuit for a three-phase stepping motor as set forth in claim 1 wherein three power switches are provided and wherein the last-mentioned means comprises means for interconnecting the outputs of each pair of said power switches to the input of the other power switch to form a tristable NAND circuit relationship among said power switches.

5. A reversible direct coupled drive circuit for a three-phase stepping motor as set forth in claim 4 wherein said memory circuit comprises respective NOR circuits coupled to the respective outputs of said power switches, the outputs of each pair of said NOR circuits coupled to the input of the other NOR circuit so as to form a tristable circuit relationship among said NOR circuits, and respective AND circuits having a LOAD pulse input and coupling the outputs of said power switches to the respective NOR circuits.

6. A reversible direct coupled drive circuit for a multiphase stepping motor as set forth in claim 3, wherein the formed power switch circuit is a multistable NAND circuit and wherein respective AND circuits having an ADVANCE pulse input couple the outputs of the respective NOR circuits to respective OR inputs of the respective NAND power switches.

7. A reversible direct coupled drive circuit for a multiphase stepping motor as set forth in claim 3, wherein means are provided for filtering high frequency noise signals substantially to prevent error operation of said power switches and said NOR circuits.

8. A reversible direct coupled drive circuit for a multiphase stepping motor as set forth in claim 6, wherein diode transistor logic is employed to form said NAND power switch circuit and said NOR memory circuit and wherein a first bus provides the ADVANCE pulse input to said AND circuits, respective other AND circuits coupling the outputs of the respective NOR circuits to respective other OR inputs of the respective NAND power switches in a coupling arrangement which provides for reverse sequencing, and a second bus providing an ADVANCE pulse input to said other AND circuits for selectable reverse motor stepping operation.

References Cited

UNITED STATES PATENTS

| | | | |
|---|---|---|---|
| 3,109,131 | 10/1963 | Byrd | 318—138 |
| 3,124,732 | 3/1964 | Dupy | 318—138 |
| 3,304,480 | 2/1967 | Ko | 318—138 |
| 3,345,547 | 10/1967 | Dunne | 318—138 |

ORIS L. RADER, *Primary Examiner.*

G. SIMMONS, *Assistant Examiner.*